US012275259B2

(12) United States Patent
Álvarez Pérez

(10) Patent No.: US 12,275,259 B2
(45) Date of Patent: Apr. 15, 2025

(54) TRANSFER PAPER AND STAMPING METHOD COMBINING SCREEN PRINTING AND DIGITAL PRINTING

(71) Applicant: SUMIPRINT QUIMICA Y COLOR S.A.S., Medellín (CO)

(72) Inventor: Julio Alberto Álvarez Pérez, Envigado (CO)

(73) Assignee: SUMIPRINT QUIMICA Y COLOR S.A.S., Envigado (CO)

( * ) Notice: Subject to any disclaimer, the term of this patent is extended or adjusted under 35 U.S.C. 154(b) by 436 days.

(21) Appl. No.: 17/435,543

(22) PCT Filed: Aug. 15, 2020

(86) PCT No.: PCT/IB2020/057706

§ 371 (c)(1),
(2) Date: Dec. 8, 2021

(87) PCT Pub. No.: WO2021/028888

PCT Pub. Date: Feb. 18, 2021

(65) Prior Publication Data

US 2022/0143996 A1 May 12, 2022

(30) Foreign Application Priority Data

Aug. 15, 2019 (CO) ........................ NC2019/0008859

(51) Int. Cl.

| | |
|---|---|
| ***B41M 1/12*** | (2006.01) |
| ***B41M 3/12*** | (2006.01) |
| ***B41M 5/025*** | (2006.01) |
| ***B41M 5/52*** | (2006.01) |
| *B41M 5/03* | (2006.01) |
| *B41M 5/035* | (2006.01) |

(52) U.S. Cl.

CPC ................ *B41M 1/12* (2013.01); *B41M 3/12* (2013.01); *B41M 5/025* (2013.01); *B41M 5/52* (2013.01); *B41M 5/5218* (2013.01); *B41M 5/5254* (2013.01); *B41M 5/0256* (2013.01); *B41M 5/03* (2013.01); *B41M 5/0355* (2013.01)

(58) Field of Classification Search

CPC .......... B41M 1/12; B41M 3/12; B41M 5/025; B41M 5/52; B41M 5/5218; B41M 5/5254; B41M 5/0256; B41M 5/03; B41M 5/0355

USPC ........................................................ 428/32.28

See application file for complete search history.

(56) References Cited

U.S. PATENT DOCUMENTS

| | | | | |
|---|---|---|---|---|
| 5,501,902 | A * | 3/1996 | Kronzer | D06Q 1/12 428/479.3 |
| 6,038,977 | A | 3/2000 | Haney et al. | |
| 6,267,052 | B1 | 7/2001 | Hill et al. | |
| 2003/0174195 | A1* | 9/2003 | Onishi | B41J 3/38 347/105 |
| 2005/0032977 | A1* | 2/2005 | Chirgott | C08L 23/22 526/348 |
| 2011/0139358 | A1* | 6/2011 | Dolsey | B41M 5/035 427/148 |
| 2013/0000830 | A1 | 1/2013 | Green | |
| 2022/0143996 | A1* | 5/2022 | Álvarez Pérez | D21H 27/06 |

FOREIGN PATENT DOCUMENTS

| | | | |
|---|---|---|---|
| CN | 101148828 | A | 3/2008 |
| CN | 106696502 | A | 5/2017 |
| EP | 2418090 | A2 | 2/2012 |
| WO | 1998/017480 | A1 | 4/1998 |
| WO | 2000/064685 | A1 | 11/2000 |
| WO | 2011/075404 | A1 | 6/2011 |
| WO | 2012/152281 | A1 | 11/2012 |

OTHER PUBLICATIONS

International Search Report issued Nov. 12, 2020 for PCT/IB2020/057706.

* cited by examiner

*Primary Examiner* — Betelhem Shewareged

(74) *Attorney, Agent, or Firm* — Schmeiser, Olsen & Watts LLP

(57) ABSTRACT

The present invention refers to a coated transfer paper for receiving digital printing inks, maintaining high tonal fidelity, the paper being treated to transfer the image when it contacts a receiving base, preventing transfer to surfaces that do not have the receiving base. In addition, the invention relates to a printing method that combines the techniques of screen printing and digital printing, using the transfer paper.

15 Claims, No Drawings

TRANSFER PAPER AND STAMPING METHOD COMBINING SCREEN PRINTING AND DIGITAL PRINTING

TECHNICAL FIELD

The present invention relates to a coated transfer paper for receiving digital printing inks, maintaining high tonal fidelity, wherein said paper is treated to transfer the image by contacting with a receiving base, avoiding the transfer in surfaces which do not have such a receiving base. In addition, the present invention refers to a printing method which combines the screen printing and digital printing techniques, by employing such a transfer paper.

BACKGROUND OF THE INVENTION

Along the history, the textile industry has evolved in order to develop new finishing and printing techniques on different substrates, seeking improved properties in quality, processes optimization, costs reduction, among others.

One of the most used and developed techniques in this sense is the screen printing, which, during centuries, has been used, maintaining validity today due to an endless number of effects and textures which enrich the technique and make it varied, which effects cannot be replicated with other current technologies, such as digital printing.

On the other hand, the increase in the use of synthetic fibers such as nylon and polyester, and the need of performing applications with customized designs, has generated renewed interest towards printing thereof, whereby, as a response to said demand, indirect techniques have surged such as sublimation, allowing to print customized designs on garments, wherein through a printer, a design is applied on a substrate being usually a paper, in order to be subsequently transferred to a garment, by applying heat.

On its part, the digital printing industry has developed technologies for textile applications, providing printers for work on different textile substrates, both with direct and indirect printing.

Many efforts have been made in order to improve the transfer processes in indirect methods, developing films for transfer, many of these developments being focused on improving the resistance to wash and rub, improving the elongation, the smoothness of the films and the proper coating on dark backgrounds, wherein specifically for the case of dark backgrounds on synthetic materials the efforts have been focused on developing ink migration control.

Thus, in the state of the art there is a plurality of disclosures related to this kind of technologies and transfer papers, among which we can find, document CN101148828A, which discloses fabric treating technology, and consists especially in a thermal transfer process for silk with high color vividness and high color fastness. Which comprises a silk thermal transfer printing method, wherein the process includes the following steps: 1) Image production: the image is entered into the computer, and the image is printed on the transfer paper with ink from an ink jet printer; 2) Silk pretreatment: the process of pretreating the silk is performed with a padding coiling machine, with pretreatment agent, the processing conditions are those of immersion; then, the silk is dried with a drier at room temperature to 150° C.; 3) Image transfer: the transfer paper printed with the image is used to be adhered to the silk surface to be transferred; the transfer paper and the silk are placed on the transfer machine, and it subjects to pressure. After pressing for 20-35 seconds, the transfer paper is stripped from the silk.

Another disclosure relate to the instant transfer paper, is found in document WO/2012/152281, which refers to a transfer paper for transferring an ink printing on a fabric, said transfer paper comprises: i) a base paper; ii) an additive comprising a starch component and a binding agent; wherein the starch component is a starch selected from the group comprising: unmodified starch or modified starch or a mixture thereof; and wherein said biding agent is a binding agent selected from the group comprising: an alkyl ketene dimer, a tall oil/fumaric acid copolymer, a styrene/acrylate copolymer and an alkenyl succinic anhydride and a mixture thereof; wherein said base paper comprises an amount of said additive by being impregnated therewith; and wherein said base paper has a water uptake as defined by a Cobb-45 value of 10-100 $g/m^2$ and a having a Gurley porosity of 10-140 seconds.

On the other hand, it can be found document U.S. Pat. No. 6,038,977, which related to a method for printing the first and second images on a flexible stretchable substrate using successive screen printing and digital printing processes, the method comprising: printing a first image on the stretchable flexible substrate using a silk screen and producing a first image on a stretched flexible substrate, the first image caused by the silk screen and the stretchable flexible substrate stretching during printing; mounting a template material on a drum of a digital printer; printing a second image on the template material with the digital printer, the first and second images being related to form a composite image; placing the stretched flexible substrate on the drum of the printer with respect to the template material; aligning the stretched flexible substrate in a desired position so that the first image on the stretched flexible substrate is in alignment with the second image on the template material; mounting the stretched flexible substrate on the drum of the digital printer at the desired position; and printing the second image on the stretched flexible substrate using the digital printer, whereby the first image and the second image are aligned.

Similarly, document U.S. Pat. No. 6,267,052B1 relates to a method for forming images on a substrate, the method consisting of applying a first layer to the substrate to form a "print pattern" and a second step of presenting an "addressed design" to the substrate, both within an outside the area of the print pattern. Within the print pattern, the addressed design is formed into a "durable image material" forming at least a part of the design layer and outside the print pattern, the addressed design does not form a durable image material, therefore, only a durable image is formed on the first layer applied to the substrate.

Finally, document EP2418090 relates to a transfer paper having a porous filter layer formed by gravure printing on a paper base. The weight of porous filter layer is 30-60 $g/m^2$ and the air permeability of porous filter layer is 110-500 ml/min. The porous filter layer contains carboxymethyl cellulose or ethanol-soluble hydroxypropyl cellulose.

From the information disclosed in the documents of the state of the art, it can be clearly seen that there is a main problem related to obtaining finishing in fabrics or other substrates which guarantee suitable adherence properties, rubbing resistance, high definition, finish with multiple touch and visual effects, with improved resistance and solidity, easy to handle, cost efficient, ecologic and which avoid migration of the colors.

According to the above, it is clear that in the state of the art there is a need for offering a method which allows the combined application of the screen printing method along with the digital printing method, providing as a connection element between both technologies, a transfer paper, specifically developed for such end, with a series of improved adherence properties, high definition, migration control, without restricting its application to other compatible substrates. Allowing to achieve finish and effects which previously required high time and effort investments.

SUMMARY OF THE INVENTION

The present invention is directed to the field of textile printing, namely, it is directed to screen printing and digital printing techniques, merging both techniques in a new process including a coated transfer paper, which allows the combination of both methods.

Wherein by combining both methods the versatility of screen printing and the range of colors and high resolution of digital printing are obtained. Several problems are solved featured by digital printing on textiles, such as: adhesion on different types of textiles substrates, fastness, elongation, coating on dark backgrounds, colorant migration control on dark backgrounds on synthetic fabrics, application of special effects.

Detachment of the paper after cold or hot applied can be performed.

With this method it is not necessary to apply cutting processes and the traditional stripping required in cutting vinyl applied to textiles, since the image printed on the transfer paper will be fixed only on the silhouette of the receiving base previously printed. The above allows to perform transfer processes for single pieces in iron-type heat presses and also transfer processes for fabric rolls in calendar-type heat presses.

This method comprises the steps of printing a shape or drawing on a substrate, applying between one and three layers of Receiving Base Ink (RBI) using the screen printing technique, said base should be dry to the touch. The transfer paper is printed with Special Digital Ink (SDI) with a selected design, applying the method of digital printing, let dry. Then, contacting directly the image printed on the transfer paper, on the area printed with the Receiving Base Ink on the substrate, in a matching manner, pressing at a determined temperature and pressure and finally, removing the paper.

The transfer paper is formed by a bond-, kraft- or glassine-type cellulose sheet, a coating layer containing water-soluble polymers, solids in suspension, resin or polymer compatible with transfer base material (TBR), binding polymer, release agents, emulsifiers, pH Stabilizers and Preservatives.

In a preferred modality, the printing method combining screen printing and digital printing is performed on a white cotton fabric, wherein initially a white RBI (Receiving Ink Base) base is applied, with a screen silk with shape of a specific design, applying two layers of RBI ink with intermediate pre-drying. Then, with a coated transfer paper, the selected design is printed in a piezoelectric head printer (desktop or large format) loaded with SDI (Special Digital Ink). The printed paper is allowed to dry and then it is placed on the RBI already printed in a matching manner and in the heating press is transferred, for finally removing the transfer paper.

DETAILED DESCRIPTION OF THE INVENTION

The present invention relates to a transfer paper which acts as a medium allowing to receive the digital printing keeping the high fidelity in tone and further allows transfer the digital image by contacting the Receiving Base Ink. In areas of the substrate where there is no Receiving Base Ink, will not be transferred the image from the paper to the substrate, the latter being a big advantage since it avoids the substrate contamination in undesired areas and increases the productivity of transfer. In addition, it relates to a novel printing method which uses such a paper.

The Special Transfer Paper has a specific coating and according to each type of Receiving Base applied. The function of the paper is to receive the digital printing and to be able to deposit thereon the Receiving Base Ink of the substrate generating a pigment encapsulation at the time of the transfer, with which the high fastness of this technique is achieved, which cannot be achieved with the direct mediums of digital printing with pigments.

Due to the elements forming said paper, it is also evidenced a high affinity and applicability of transfer to different thermoplastic polymers materials such as:

PET (Polyethylene Terephthalate)
HDPE (High Density Polyethylene)
PVC (Polyvinyl Chloride)
LDPE (Low Density Polyethylene)
PP (Polypropylene)
PS (Polystyrene)

Wherein the application thereon will depend on the techniques employed to melt said materials, in order to achieve high-quality printings, as mentioned above.

Below, each of the elements forming the above-mentioned transfer paper are mentioned.

Paper Base

The base is a bond- or kraft-type paper cellulose sheet with weight ranging from 40 to 150 grams per square meter. For special cases where a greater transparency is required for a better record of the paper on the silkscreen base (RBI) and in case the low weight kraft type paper does not provide the needed transparency, a glassine-type paper can be used which has a weight between 50 and 90 grams per square meter.

The coating of the transfer paper generally may achieve an interval from 5 to 40 percent weight, on the total weight of the base paper.

The coating consists of the following elements:

| |
|---|
| Water soluble polymers: 0-30% |
| Suspended solids: 0-10% |
| Base resin or polymer compatible with the transfer base material 8-30% |
| Binding polymer 2-10% |
| Release agents 0-8% |
| Emulsifiers 0-4% |
| pH stabilizers 0-2% |
| Preservatives 0-1% |
| Water to complete 100% |

Water Soluble Polymers

These can be non-ionic or ionic, type polyvinyl or cellulose ethers, for the case of polyvinyl alcohol these can be used totally or partially hydrolyzed the latter being the most used and its molecular weight may vary seeking to generate different viscosities. The cellulose polymers can be non-ionic cellulose ethers, based on wood pulp or cotton layer. There are two main types of cellulose ethers, EHEC (ethyl hydroxyethyl cellulose) and MEHEC (methyl ethyl hydroxyethyl cellulose). The same with the ionic ones such as carboxymethyl cellulose CMC, which can be presented in the form of powders with different particle size. Other soluble polymers may be starch, polyvinyl pyrrolidone.

These act as thickeners, stabilizing agents for suspensions, water retention agents, dispersing agents, binding agents, colloid protector.

Suspended Solids

These have several roles among the formulation, one of which is to increase the solids in the coating but its main function is to generate a high porosity which allows the proper drying of the ink when high quality designs are required in digital printing which exceed an ink dosing of 4 ml per square meter, for this, fine granulometry minerals can be used, with sized comprised between 0.7 microns (um) and 10 um, such as carbonates, calcinated kaolin, fumed silica and fumed alumina, the latter being the most suitable since they impart transparency to the application and thus, they not only control the definition but also the sharpness of tones.

Base Resin or Polymer Compatible with the Transfer Base Material

These have the ability to melt with the receiving base ink (RBI) or with other materials which are compatible therewith, it is a free tack polymer at high temperature to avoid the adherence to substrate in undesired areas. For the case, polymers with a glass transition temperature greater than 35° C. are used, and it can be a hard acrylic polymer or polymers with Core Shell technology or vinyl polymers such as vinyl polychloride. In general, thermoplastic polymers. Other polymers being used could be polyamides or polyurethanes with particle size distribution suitable for application.

Binding Polymer

The binder may be an acrylate or methacrylate esters latex, or both. The ester portion of these monomers could be groups C1-C6 alkyl, such as, for instance, groups methyl, ethyl and butyl. The methyl esters typically impart "hard" properties, while other esters typically impart "soft" properties. The terms "hard" and "soft" are used in a qualitative manner to refer to the hardness at room temperature and the flexibility at low temperature, respectively, and ethyl vinyl resins can also be used since these are suitable due to its softness and its compatibility with other elements of the composition described herein, the solids of these resins usually vary from 40% to 60%.

Release Agents

To improve the release conditions and to be able to perform it both in cold and hot conditions, substances providing this function in the composition are required, whereby vaselines, mineral oils or polyethylene oxides with a polymerization degree between 200 and 400 where used. These products be being insoluble in aqueous systems must be brought to liquid for the case of vaselines and then they must be emulsified to make them stable and to be able to incorporate in the system to generate a water-based composition being creamy and lightly fluid.

Emulsifiers

An anionic surfactant may be used, if desired. Examples of anionic surfactants include, among others, linear and branched chain sodium alkyl benzene sulfonates, linear and branched chain alkyl sulfates, and linear and branched chain alkyl ethoxy sulfates. Examples of non-ionic surfactants include, again by way of illustration only, alkyl polyethoxylates, alcohol polyethoxylated, fatty acid ethanol amides. Also, sorbitan esters (Span) feature good performance, as emulsifiers W/O in combination with ethoxylated sorbitan esters (Tween) contribute to the general stability of emulsions O/W. The manipulation of the Span/Tween ratio produces emulsifying systems of several HLB values, allowing the emulsification of the release agents of the present invention.

pH Stabilizer 2-amino-2-methyl-1-propanol at 95% is a very efficient amino alcohol to neutralize and regulate the pH of formulations. It provides improved brightness and does not impact the coating resistance to washing cycles, also other amines can be used such as triethanolamine being used mainly as emulsifier and surfactant. It adjusts and buffers the pH and improves the stability of emulsions.

Preservatives

Preservatives derived from chloromethylisothiazolinone with a wide range of activity can be used for: bacteria control (gram negative and gram positive) and fungi, such as yeasts and molds, with no formaldehyde, authorized by FDA in adhesives and paper coatings, low toxicity, is microbicide non-toxic in the recommended use levels in its final formulation, compatible: with surfactants and emulsifiers regardless of its ionic nature.

Said transfer paper comprises a base formed by a bond-, kraft- or glassine-type cellulose sheet; a coating layer containing 0-30% wt. water soluble polymers, such as polyvinyl alcohol or cellulose ethers; 0-10% wt. of suspended solids for drying the ink, such as, fine granule minerals with size comprised between 0.7 and 10 microns; 8-30% wt. of base resin or polymer compatible with transfer base material, such as, thermoplastic polymers; 2-10% wt. of binding polymer, such as, vaselines, mineral oils or polyethylene oxides; 0-4% wt. of emulsifiers, such as, anionic surfactants; 0-2% wt. of stabilizer; 0-1% wt. of preservatives.

Wherein the water soluble polymers of the coating are selected from the group consisting of totally or partially hydrolyzed polyvinyl alcohol or cellulose ethers, such as EHEC (ethyl hydroxyethyl cellulose) and MEHEC (methyl ethyl hydroxyethyl cellulose), carboxymethyl cellulose, starch or polyvinyl pyrrolidone; wherein the suspended solids of the coating are selected from the group consisting of carbonates, calcinated kaolin, fumed silica and fumed alumina; wherein the compatible base resin or polymer of the coating is selected from the group consisting of thermoplastic polymers, such as, hard acrylic polymers or Core Shell technology polymers or vinyl polymers such as vinyl polychloride, polyamides or polyurethanes; wherein the binding polymer of the coating is selected from the group consisting of acrylate esters latex, methacrylate, or both, the ester portion of these monomers may be groups C1-C6 alkyl, such as groups methyl, ethyl and butyl, ethylene vinyl resins; wherein the vaselines, mineral oils or polyethylene oxides of the release agent are present in emulsified liquid state, with a polymerization degree between 200 and 400; wherein the emulsifiers of the coating are selected from the group consisting of linear or branched chain sodium alkyl benzene sulfonates, linear and branched chain sulfate alkyl, and linear and branched chain sulfate ethoxy alkyl, polyethoxylated alkyl, polyethoxylated alcohols, fatty acid ethanol amides, sorbitan esters (Span), emulsifiers (water/oil) combined with ethoxylated sorbitan esters (Tween), contribute to the general stability of oil/water emulsions; wherein the stabilizer of the coating is 2-amino-2-methyl-1-propanol at 95%; wherein the preservatives of the coating are selected from the group consisting of derivatives of chloromethylisothiazolinone; wherein the dry coating layer of the paper can be found in a range from 5 to 40% wt., of the total weight of the transfer paper, and the bond- or kraft-type cellulose sheets have weights ranging from 40 and 150 $g/m^2$, and the glassine sheets have a weight ranging from 50 to 90 $g/m^2$.

In a preferred mode, the transfer paper comprises: a bond paper sheet of 80 $g/m^2$ applying wet coating in a range from 40 to 50 grams per square meter, wherein said coating comprises 15% pvc resin K-74; 3% ethoxylated lauryl alcohol; 2% polyethylene glycol between 200-400 moles; 1% fumed silica; 5% water solution at 10% in medium viscosity polyvinyl alcohol; 0.2% 2-methyl-4-thiazoline-3-ketone; 5-chloro-methyl-4-thiazoline-3-ketone; 0.5%; 2-amino-2-methyl-1-propanol at 95%; 5% acrylic resin in emulsion; water to complete 100%.

Wherein said components are homogeneously mixed together to obtain a paste which is applied on the paper in the proportion indicated.

In an embodiment, the transfer paper comprises a kraft paper sheet of 60 g/$m^2$ applying wet coating in a range from 40 to 50 grams per square meter, wherein said coating comprises 15% solid acrylic resin; 3% ethoxylated lauryl alcohol; 2% polyethylene glycol between 200-400 moles; 1% fumed silica; 5% water solution at 10% in medium viscosity polyvinyl alcohol; 0.2% 2-methyl-4-thiazoline-3-ketone; 5-chloro-methyl-4-thiazoline-3-ketone; 0.5%; 2-amino-2-methyl-1-propanol at 95%; 5% acrylic resin in emulsion; water to complete 100%.

Wherein said components are homogeneously mixed together to obtain a paste which is applied on the paper in the proportion indicated.

The printing method combining screen printing and digital printing includes the following steps:

a. Printing a shape or drawing on a substrate, applying the silkscreen technique, providing between one and three layers of Receiving Base Ink (RBI).
b. Pre-drying the printing of step a) at a temperature from 80 to 120° C., for a period between 5 and 20 seconds.
c. Printing with Special Digital Ink (SDI) on the transfer paper, a selected design, applying the digital printing method, through a piezoelectric head digital printer.
d. After printed, drying the transfer paper at a temperature from 23 to 55° C., between 10 and 60 seconds.
e. Directly contacting the printed image in transfer paper, on the area stamped with Receiving Base Ink in the substrate, in a matching manner.
f. Pressing from 30 to 90 lb/square inch, at a temperature from 150 to 210° C. for a period between 15 and 60 seconds.
g. Removing the transfer paper from the substrate.

In an embodiment, the substrate is a textile, and it can be cotton, polyester, nylon, mixtures thereof or other textile fibers, in dark or light colors.

In an embodiment, the pressing step is performed in a thermal press or a calendar-type heat presses, and the paper in the final step is removed in cold or hot.

In another alternative, the digital transfer printing method is performed on a thermoplastic substrate, and it is characterized by comprising the following steps:

a. Printing with Special Digital Ink (SDI) on the transfer paper, applying the digital printing technique, through a piezoelectric head digital printer.
b. Drying the transfer paper at a temperature from 23 to 55° C., for a period between 10 and 60 seconds.
c. Directly contacting the printed image in transfer paper, on a thermoplastic substrate, such as PET (polyethylene terephthalate), HDPE (high density polyethylene), PVC (polyvinyl chloride), LDPE (low density polyethylene), PP (polypropylene) and PS (polystyrene), in the area where the image wants to be placed.
d. Pressing from 30 to 90 lb/$in^2$, at a temperature from 150 to 210° C. for a period between 15 and 60 seconds, using a thermal press which adapts to the shape and required use of each substrate.
e. Removing the transfer paper from the substrate On another embodiment, the Receiving Base Ink (RBI) can be of different effects and finishes, such as: white for receiving flat colors, thermochromic, photochromic, fluorescent, metallized, or with textured effects or it may feature fragrances which broaden and enrich the variety of finishes.

In another desired alternative, the stamping paper used in step c) of the method, is formed by a base formed by a bond-, kraft- or glassine-type cellulose sheet; a coating layer containing 0-30% wt. water soluble polymers, such as polyvinyl alcohol or cellulose ethers; 0-10% wt. suspended solids for drying the ink, such as, fine granule minerals with size comprised between 0.7 and 10 microns; 8-30% wt. of base resin or polymer compatible with transfer base material, such as, thermoplastic polymers; 2-10% wt. of binding polymer, such as, acrylate esters latex, methacrylate, or both; 0-8% release agents, such as, vaselines, mineral oils or polyethylene oxides; 0-4% wt. of emulsifiers, such as, anionic surfactants; 0-2% wt. of pH stabilizer; 0-1% wt. of preservatives; wherein the water soluble polymers of the coating are selected from the group consisting of totally or partially hydrolyzed polyvinyl alcohol or cellulose ethers, such as EHEC (ethyl hydroxyethyl cellulose) and EHEC (methyl ethyl hydroxyethyl cellulose), carboxymethyl cellulose, starch or polyvinyl pyrrolidone; wherein the suspended solids of the coating are selected from the group consisting of carbonates, calcinated kaolin, fumed silica and fumed alumina; wherein the compatible base resin or polymer of the coating is selected from the group consisting of thermoplastic polymers, such as, hard acrylic polymers or Core Shell technology polymers or vinyl polymers such as vinyl polychloride, polyamides or polyurethanes; wherein the binding polymer of the coating is selected from the group consisting of acrylate esters latex, methacrylate, or both, the ester portion of these monomers may be groups C1-C6 alkyl, such as groups methyl, ethyl and butyl, ethylene vinyl resins; wherein the vaselines, mineral oils or polyethylene oxides of the release agent are present in emulsified liquid state, with a polymerization degree between 200 and 400; wherein the emulsifiers of the coating are selected from the group consisting of linear or branched chain sodium alkyl benzene sulfonates, linear and branched chain sulfate alkyl, and linear and branched chain sulfate ethoxy alkyl, polyethoxylated alkyl, polyethoxylated alcohols, fatty acid ethanol amides, sorbitan esters (Span), emulsifiers (water/oil) combined with ethoxylated sorbitan esters (Tween), contribute to the general stability of oil/water emulsions; wherein the stabilizer of the coating is 2-amino-2-methyl-1-propanol at 95%; wherein the preservatives of the coating are selected from the group consisting of derivatives of chloromethylisothiazolinone; wherein the dry coating layer of the paper can be found in a range from 5 to 40% wt., of the total weight of the transfer paper, and the bond- or kraft-type cellulose sheets have weights ranging from 40 and 150 g/$m^2$, and the glassine sheets have a weight ranging from 50 to 90 g/$m^2$.

In a preferred modality, the printing method combining silkscreen and printing is performed on a white cotton fabric, wherein initially a white RBI (Receiving Base Ink) base is applied, with a silkscreen silk of 55 threads/cm with the shape of a specific design, applying two layers of RIB ink with intermediate pre-drying. Then, a coated kraft transfer paper of 80 grams/$m^2$ is used, the selected design is printed in a piezoelectric head printer loaded with SDI (Special Digital Ink) at a ratio greater than 250.000 points/square inch, it is allowed to dry at 25° C. for 2 minutes and then it is placed on the RBI already printed. It must be placed such that it matches and directly contacts the printed part with the RBI. It is placed on a pressure iron at a pressure of 60 lb/square inch, at a temperature of 185° C. for a time of 25 seconds. After this time has passed, it is removed from the iron and it is allowed to cool for 1 minute, to proceed to detach the paper, achieving the complete transfer of the image to the RBI base on the textile substrate with a high degree of definition in the contours and being very easy to remove the paper. The application has high definition and excellent solidity to rubbing and wet washing. It was subjected to washing tests in a conventional washing machine supporting 20 cycles with a rating of 4.5-5 in the grayscale.

The main advantages of the new transfer paper and method using it, are:

High definition and resolution of the images.
Multiple special effects.
Coating on dark backgrounds.
Adherence to different substrates.
High elongation capacity.
High resistance and solidity to wash.
Colorant migration control.
Easy to handle technique allows high productivity.
System suitable for large and small runs.
Agility in customization of garments.
Possibility to use small or large format printers.

The invention claimed is:

1. A transfer paper comprising:

a base formed by a bond-, kraft- or glassine-type cellulose sheet; and a coating layer comprising 0.1-30% wt. water soluble polymers, 0.1-10% wt. suspended solids for drying the ink, 8-30% wt. base resin or polymer compatible with transfer base material, 2-10% wt. binding polymer, 0.1-8% release agents, 0.1-4% wt. emulsifiers, 0.1-2% wt. pH stabilizer, and 0.1-1% wt. preservatives.

2. The transfer paper according to claim 1, wherein the water soluble polymers of the coating are selected from the group consisting of totally or partially hydrolyzed polyvinyl alcohol or cellulose ethers, carboxymethyl cellulose, starch and polyvinyl pyrrolidone.

3. The transfer paper of claim 1, wherein the suspended solids of the coating are selected from the group consisting of carbonates, calcinated kaolin, fumed silica and fumed alumina.

4. The transfer paper according to claim 1, wherein the compatible base resin or polymer of the coating is selected from the group consisting of thermoplastic polymers.

5. The transfer paper according to claim 1, wherein the binding polymer of the coating is selected from the group consisting of acrylate esters latex, methacrylate, or both, the ester portion of these monomers may be groups C1-C6 alkyl.

6. The transfer paper according to claim 1, wherein vaselines, mineral oils or polyethylene oxides of the release agent are present in emulsified liquid state, with a polymerization degree between 200 and 400.

7. The transfer paper according to claim 1, wherein the emulsifiers of the coating are selected from the group consisting of linear or branched chain sodium alkyl benzene sulfonates, linear and branched chain sulfate alkyl, and linear and branched chain sulfate ethoxy alkyl, polyethoxylated alkyl, polyethoxylated alcohols, fatty acid ethanol amides, sorbitan esters (Span), emulsifiers (water/oil) combined with ethoxylated sorbitan esters (Tween), contribute to the general stability of oil/water emulsions.

8. The transfer paper according to claim 1, wherein the stabilizer of the coating is 2-amino-2-methyl-1-propanol at 95% wt.

9. The transfer paper according to claim 1, wherein the preservatives of the coating are selected from the group consisting of derivatives of chloromethylisothiazolinone.

10. The transfer paper according to claim 1, wherein the bond- or kraft-type cellulose sheets have weights ranging from 40 and 150 g/$m^2$, and the glassine sheets have a weight ranging from 50 to 90 g/$m^2$.

11. The transfer paper according to claim 1, wherein paper coating layer is found in a range from 5 and 40% wt., on the basis of dry weight of the paper.

12. The transfer paper according to claim 1, comprising:

a bond paper sheet of 80 g/$m^2$ applying wet coating in a range from 40 to 50 grams per square meter, wherein the coating comprises, 15% wt. pvc resin K-74;

3% wt. ethoxylated lauryl alcohol;

2% wt. polyethylene glycol between 200-400 moles;

1% wt. fumed silica;

5% wt. water solution at 10% in medium viscosity polyvinyl alcohol;

0.2% wt. 2-methyl-4-thiazoline-3-ketone; 5-chloromethyl-4-thiazoline-3-ketone;

0.5% wt. 2-amino-2-methyl-1-propanol at 95%;

5% wt. acrylic resin in emulsion; and water to complete 100%, wherein the components are homogeneously mixed together to obtain a paste which is applied on the paper in the proportion indicated.

13. The transfer paper according to claim 1, comprising:

a kraft paper sheet of 60 g/$m^2$ applying wet coating in a range from 40 to 50 grams per square meter, wherein the coating comprises:

15% wt. solid acrylic resin;

3% wt. ethoxylated lauryl alcohol;

2% wt. polyethylene glycol between 200-400 moles;

1% wt. fumed silica;

5% wt. water solution at 10% in medium viscosity polyvinyl alcohol;

0.2% wt. 2-methyl-4-thiazoline-3-ketone; 5-chloromethyl-4-thiazoline-3-ketone;

0.5% wt. 2-amino-2-methyl-1-propanol at 95%;

5% wt. acrylic resin in emulsion; and water to complete 100%, wherein the components are homogeneously mixed together to obtain a paste which is applied on the paper in the proportion indicated.

14. The transfer paper of claim 1, wherein the coating layer is an outermost layer of the transfer paper.

15. The transfer paper of claim 1, wherein the transfer paper is treated to transfer an image when contacting a substrate, and in areas of the substrate that do not include receiving base ink, the image is not transferred to the substrate.

* * * * *